US012006494B2

(12) United States Patent
Agarkhed et al.

(10) Patent No.: US 12,006,494 B2
(45) Date of Patent: Jun. 11, 2024

(54) BAR COMPOSITIONS COMPRISING $C_{10}$ SOAP WHILE MINIMIZING RATIO OF UNSATURATED $C_{18}$ SOAP TO CAPRATE

(71) Applicant: Conopco, Inc., Englewood Cliffs, NJ (US)

(72) Inventors: Ajit Manohar Agarkhed, Thane (IN); Prem Chandar, Closter, NJ (US); Nitish Kumar, Bihar (IN); Connor Patrick Walsh, Seymour, CT (US); Guohui Wu, Woodbridge, CT (US)

(73) Assignee: CONOPCO, INC., Englewood Cliffs, NJ (US)

( * ) Notice: Subject to any disclaimer, the term of this patent is extended or adjusted under 35 U.S.C. 154(b) by 161 days.

(21) Appl. No.: 17/431,727

(22) PCT Filed: Feb. 11, 2020

(86) PCT No.: PCT/EP2020/053435

§ 371 (c)(1),
(2) Date: Aug. 18, 2021

(87) PCT Pub. No.: WO2020/177988

PCT Pub. Date: Sep. 10, 2020

(65) Prior Publication Data

US 2022/0135910 A1 May 5, 2022

(30) Foreign Application Priority Data

Mar. 1, 2019 (EP) .................................... 19160273

(51) Int. Cl.

| | |
|---|---|
| ***C11D 9/00*** | (2006.01) |
| ***C11D 9/02*** | (2006.01) |
| ***C11D 9/04*** | (2006.01) |
| ***C11D 9/10*** | (2006.01) |
| ***C11D 9/20*** | (2006.01) |
| ***C11D 9/22*** | (2006.01) |
| ***C11D 9/26*** | (2006.01) |
| ***C11D 17/00*** | (2006.01) |

(52) U.S. Cl.
CPC ............ *C11D 9/02* (2013.01); *C11D 17/0065* (2013.01)

(58) Field of Classification Search
None
See application file for complete search history.

(56) References Cited

U.S. PATENT DOCUMENTS

| | | | |
|---|---|---|---|
| 2,820,768 A | 1/1958 | Hubert Fromont | |
| 3,576,749 A | 4/1971 | Megson et al. | |
| 3,723,325 A | 3/1973 | Parran, Jr. | |
| 4,468,338 A | 8/1984 | Lindberg | |
| 4,707,496 A * | 11/1987 | Simmons | C11D 3/48 514/738 |
| 4,874,538 A | 10/1989 | Dawson et al. | |
| 5,264,144 A * | 11/1993 | Moroney | C11D 9/007 510/153 |
| 5,264,145 A * | 11/1993 | French | C11D 10/04 510/153 |
| 5,540,852 A | 7/1996 | Kefauver et al. | |
| 5,728,663 A | 3/1998 | Lambino | |
| 5,750,481 A | 5/1998 | Del Vecchio et al. | |
| 6,852,681 B1 | 2/2005 | Kerschner et al. | |
| 2002/0037818 A1 | 3/2002 | Schultz et al. | |
| 2002/0039978 A1 | 4/2002 | Schultz et al. | |
| 2004/0097387 A1 | 5/2004 | Taylor et al. | |
| 2011/0105612 A1 | 5/2011 | Changaris | |
| 2013/0130960 A1 | 5/2013 | Astolfi et al. | |
| 2014/0024573 A1 | 1/2014 | Agarkhed et al. | |
| 2016/0376526 A1 | 10/2016 | Smith | |
| 2016/0374973 A1 | 12/2016 | Smith | |
| 2017/0121641 A1 | 5/2017 | Smith | |

(Continued)

FOREIGN PATENT DOCUMENTS

| | | |
|---|---|---|
| CN | 1230214 | 9/1999 |
| CN | 103666884 | 3/2015 |
| CN | 105324476 | 2/2016 |

(Continued)

OTHER PUBLICATIONS

Search Report and Written Opinion in EP19160274; dated Jul. 23, 2019; European Patent Office (EPO).
Search Report and Written Opinion in EP19160273; dated Jul. 11, 2019; European Patent Office (EPO).
Search Report and Written Opinion in PCTEP2020054755; dated Apr. 24, 2020; World Intellectual Property Org. (WIPO).
Search Report and Written Opinion in PCTEP2020053435; dated Apr. 30, 2020; World Intellectual Property Org. (WIPO).
Written Opinion 2 in PCTEP2020054755; dated Feb. 22, 2021; World Intellectual Property Org. (WIPO).
IPRP2 in PCTEP2020054755; dated Jun. 2, 2021; World Intellectual Property Org. (WIPO).
Written Opinion 2 in PCTEP2020053435; dated Feb. 19, 2021; World Intellectual Property Org. (WIPO).

(Continued)

*Primary Examiner* — Lorna M Douyon
(74) *Attorney, Agent, or Firm* — Krista J. Aiello

(57) ABSTRACT

The invention relates to bar composition comprising minimum floor levels of $C_{10}$ soap while minimizing ratio of unsaturated $C_{18}$ soap to caprate. Such bars provide enhanced rapid, antibacterial activity. Disclosed is a soap bar composition comprising: a) 25 to 85%, preferably 35 to 75% by weight of $C_8$ to $C_{24}$ fatty acid soap comprising: (i) C10 soap at 8% or 15% or greater, more preferably 16 to 32% by weight of total bar composition; and, (ii) unsaturated $C_{18}$ soap, wherein weight ratio of said unsaturated $C_{18}$ soap to $C_{10}$ (caprate) soap is 1.2 to 0.1. b) 1 to 45% organic and inorganic adjuvant materials by weight of the composition; and, c) 5 to 30%, preferably 13 to 28% water by weight of the composition, wherein excess of $C_{10}$ soap to unsaturated $C_{18}$ soap is at least 6%.

6 Claims, No Drawings

(56) References Cited

U.S. PATENT DOCUMENTS

2018/0305644 A1* 10/2018 Astolfi .................. C11D 9/007

FOREIGN PATENT DOCUMENTS

| | | |
|---|---|---|
| CN | 109181907 | 1/2019 |
| EP | 0062352 | 7/1986 |
| EP | 0294010 | 12/1988 |
| EP | 0534100 | 3/1993 |
| GB | 2235930 | 3/1991 |
| JP | 50046708 | 4/1975 |
| JP | 9059692 | 3/1997 |
| JP | H10503234 | 3/1998 |
| JP | 2020075887 | 5/2020 |
| UA | 26309 | 8/1999 |
| WO | WO9603487 | 2/1996 |
| WO | WO9802517 | 1/1998 |
| WO | WO0022082 | 4/2000 |
| WO | WO0180821 | 11/2001 |
| WO | WO02053689 | 7/2002 |
| WO | WO03002706 | 1/2003 |
| WO | WO03068901 | 8/2003 |
| WO | WO2004046294 | 6/2004 |
| WO | WO2004108877 | 12/2004 |
| WO | WO2005068601 | 7/2005 |
| WO | WO2005097964 | 10/2005 |
| WO | WO2006138738 | 12/2006 |
| WO | WO2011073139 | 6/2011 |
| WO | WO2011080101 | 7/2011 |
| WO | WO2012136502 | 10/2012 |
| WO | WO2013076047 | 5/2013 |
| WO | WO2014170187 | 10/2014 |
| WO | WO2015169678 | 11/2015 |
| WO | WO2015189566 | 12/2015 |
| WO | WO2016012163 | 1/2016 |
| WO | WO2017016802 | 2/2017 |
| WO | WO2017016803 | 2/2017 |
| WO | WO2017016807 | 2/2017 |
| WO | WO2017129472 | 8/2017 |
| WO | WO2020178056 | 9/2020 |

OTHER PUBLICATIONS

IPRP2 in PCTEP2020053435; dated Jun. 1, 2021; World Intellectual Property Org. (WIPO).

Jensen et al.; Quantifying the Effects of Water Temperature, Soap Volume Lather Time, and Antimicrobial Soap as Variables in the Removal of *Escherichia coli* ATCC 11229 from Hands; Journal of Food Protection; May 15, 2017; pp. 1022-1031; vol. 80, No. 6; International Association for Food Protection.

* cited by examiner

BAR COMPOSITIONS COMPRISING $C_{10}$ SOAP WHILE MINIMIZING RATIO OF UNSATURATED $C_{18}$ SOAP TO CAPRATE

CROSS REFERENCE TO RELATED APPLICATIONS

The present application is a U.S. National Phase Application under 35 U.S.C. § 371 of International Application No. PCT/EP2020/053435, filed on Feb. 11, 2020, which claims priority to European Patent Application No. 19160273.9, filed on Mar. 1, 2019, the contents of which are incorporated herein in their entireties.

FIELD OF THE INVENTION

The present invention relates to fatty acid-based soap bars which are typically prepared by saponification (e.g., neutralization) of triglyceride oil comprising fatty acid esters (linked to glycerol base of triglyceride oils) of varying chain length. It further relates to use of novel combinations of minimum amounts of particular chain lengths (e.g., $C_{10}$) of the esters forming the soaps while minimizing others (including minimizing both chain length amounts and/or level of saturation or unsaturation of certain fatty acid esters) to enhance anti-bacterial activity.

BACKGROUND OF THE INVENTION

Commercial soap bars conventionally comprise one or more "soaps", which, for purposes of describing this component of the soap bars of the present invention, has the meaning as normally understood in the art: monovalent salts of monocarboxylic fatty acids. As noted, they are formed typically by saponification of triglyceride oils. The counterions of the salts generally include sodium, potassium, ammonium and alkanolammonium ions, but may include other suitable ions known in the art. The final soap bars also may include optional adjuvant ingredients such as moisturizers, humectants, water, fillers, polymers, dyes, fragrances and the like to effect cleansing and/or conditioning for the skin of the user.

Typically, the soap components in conventional soap bars comprise salts of long chain fatty acids having chain lengths of the alkyl group of the fatty acid from about 8 carbon atoms to 24 carbon atoms, preferably 12 carbon atoms to about 18 carbon atoms in length. The particular length of the alkyl chain(s) of the soaps is selected for various reasons including cleansing capability, lather capability, costs, and the like. It is known that soaps of shorter chain lengths are more water-soluble (i.e., less hydrophobic) and produce more lather compared to longer chain length soaps. Longer chain length soaps are often selected for cost reasons and to provide structure to the soap bars.

To provide an anti-bacterial property to such conventional soap bars, it is generally necessary to add germicides or antibacterial agents to the soap bars. Thus, for example, bars containing antimicrobials such as triclosan (i.e., 2,4,4'-trichloro-2'-hydroxy-diphenylether) and triclocarbanilide are known. However, the addition of antibacterial agents to soap bars to achieve antibacterial effectiveness can add cost to the soap bars due to the cost of the antibacterial agents themselves and the added costs of production of the soap bars.

Another way to enhance antimicrobial activity is through use of low total fatty matter bar (e.g., in which fatty acid soap is replaced by high levels of organic solvent and/or electrolyte).

WO2017/016803 and WO 2017/016807, both to Unilever, disclose a cleansing bar comprising 10 to 30% soap, 20 to 45% water soluble organic solvent, 20-40% water, and 3 to 20% electrolyte forming a low Total Fatty Mater ("TFM") bar. WO 2017/016802, also to Unilever, shows antimicrobial benefit of this bar due to lower levels of soluble surfactant.

Many other references disclose soap bars which contain broadly disclosed amounts of capric acid soap ($C_{10}$ soap) and/or unsaturated acid soaps such as oleate (e.g., $C_{18}$ with one unsaturated group in cis configuration).

Nowhere, however, is there recognized a relationship between maintaining specific floor levels of $C_{10}$ soap while simultaneously minimizing the level of overall (of any chain length) unsaturated soaps and minimizing ratio specifically of $C_{18}$ unsaturated to $C_{10}$ soap.

SUMMARY OF THE INVENTION

Unexpectedly, applicants have now found that, in fatty acid soap bars comprising typically 25 to 85%, preferably 30 to 75% fatty acid soap, wherein the amount of caprate ($C_{10}$ soap) is 7% to 32% or 8% to 32% or 9% or 10% to 32% or 11% or 12% or 13% or 14% or 15% to 32% or 16 to 32% by weight of the total bar composition. Upper level may be 31% or 30% or 29% or 28% or 25%. Upper and lower ranges noted above can be used interchangeably. A preferred range is 8 to 24% by weight of the composition; and further where simultaneously, the level of unsaturated $C_{18}$ fatty acid soaps, especially oleate (but can include $C_{18}$ with one or more unsaturated groups), is limited so that the ratio of unsaturated $C_{18}$ to $C_{10}$ (caprate) fatty acid soap is held at, preferably 1.2 and below (as low as 0.2 or 0.1 or 0%), more preferably 1.1 or below or 1.05 and below or 1.0 and below or 0.80 and below, more preferably 0.55 and below and even more preferably 0.30 and below (e.g., ratio of oleate to caprate soap of 0 to 0.30); then the antibacterial activity of this bar composition is significantly enhanced relative, for example, to a bar where the ratio is higher, for example 1.35.

It is noted that, when more soap is present, the kill is more effective at the same ratio. So, for example, bar with 60 weight % soap and 1:1 ratio is more effective then bar with 40 weight % soap and same ratio of unsaturated $C_{18}$ to caprate.

A preferred bar has 8% to 28% or 8% to 24% caprate by weight of the composition and a ratio of unsaturated $C_{18}$ fatty acid soap to caprate of 1.1 to 0 or 1.05 to 0 or 1.0 to 0. It is preferable to have an excess of caprate to $C_{18}$ unsaturated fatty acid soap. In the bars of the invention, excess of caprate to unsaturated $C_{18}$ is at least 6% or sometimes 10% or more or 14% or more.

The soap counterion can be an alkali metal such as sodium or potassium or may be, for example, an alkanolamine such as triethanolamine.

The unsaturated $C_{18}$ fatty acid soaps we refer to may have one, two or three unsaturated groups and mixtures thereof. They also include hydroxy derivatives of unsaturated $C_{18}$ soap such as hydroxyoleate and soaps of ricinoleic acid. Typically, $C_{18}$ oleate soap (one unsaturated group) are most predominant $C_{18}$ soap, but $C_{18}$ sop may also include soap of elaidic acid ($C_{18}$ soap with one unsaturated in this configuration), or $C_{18}$ soap based on fatty acid with more than one unsaturated bond (e.g., linoleic, alpha linoleic). Preferably, level of $C_{18}$ fatty acid with three unsaturated groups in less than 0.2%, more preferably less than 0.1%.

DETAILED DESCRIPTION OF THE INVENTION

The present invention relates to fatty acid soap bars (e.g., bars comprising 25 to 85% by wt. fatty acid soap) in which the $C_{10}$ soap comprises 8% to 32% as noted above of bar and ratio of $C_{18}$ unsaturated soap to $C_{10}$ soap is 1.2 to 0.1, or 1.1 to 0.1, preferably 1.05 to 0.1 as also noted above.

More specifically the invention relates to a soap bar composition comprising:

- a) 25 to 85%, preferably 35 to 75% by weight of $C_8$ to $C_{24}$ fatty acid soap comprising:
  - (i) $C_{10}$ soap at 8% or 15% or greater, more preferably 16 to 32% by weight of total bar composition; and,
  - (ii) unsaturated $C_{18}$ soap, wherein ratio of said unsaturated $C_{18}$ soap to $C_{10}$ (caprate) soap is 1.2 to 0.1,
- b) 1 to 45% organic and inorganic adjuvant materials by weight of the composition; and
- c) 5 to 30%, preferably 13 to 28% water by weight of the composition.

Furthermore specifically, the invention relates to a soap bar composition comprising:

- a) 25 to 85% by wt., preferably 28 to 76% $C_8$ to $C_{24}$ fatty acid soap; wherein:
  - (i) $C_{10}$ soap comprises 8% or 9% or 10% or 15% or greater, more preferably 16 to 32% by weight of total bar composition;
  - (ii) the level of unsaturated $C_{18}$ soap (preferably with 1, 2 or 3 unsaturated group, including $C_{18}$ unsaturated molecules with hydroxy or other derivative (e.g. hydroxyoleic acid) and mixtures thereof is such that ratio of unsaturated $C_{18}$ soap to $C_{10}$ (caprate) soap is 1.2 or 1.1 or 1.05 or 0.80 or 0.55 or 0.30;
- b) 1 to 45% by weight, preferably 2 to 45% by weight organic and inorganic adjuvant materials; and
- c) 5 to 30%, preferably 13 to 28% by wt. water.

It is noted that keeping $C_{10}$ fatty acid soap levels high (e.g., to maintain a low ratio of unsaturated $C_{18}$ to $C_{10}$ fatty acid soap) is not something which those skilled in the art would have reason to do and so there is no supply of such enriched amounts. The enriched amounts of $C_{10}$ fatty acid soap do not readily naturally occur either. In nut oil, for example, C10 soap is present in maximum amounts of 6 to 7 weight %.

More specifically, bars of the invention comprise a base of 25 to 85% by wt. C8 to C24 fatty acid soap. The fatty acid soaps, and any other surfactants which may additionally be present, should be suitable for routine contact with the human skin.

The term "soap" is used herein in its popular sense, i.e., the alkali metal or alkanol ammonium salts of aliphatic, alkanes, or alkene monocarboxylic acids. Sodium potassium, magnesium, mono-, di- and tri-ethanol ammonium cations, or combinations thereof, are the most suitable for purposes of this invention. In general, sodium soaps are used in the compositions of this invention, but up to about 15% of the soap may be potassium, magnesium or triethanolamine soaps. The soaps useful herein are the well-known alkali metal salts of natural or synthetic aliphatic (alkanoic or alkenoic) acids having about 8 to about 24 carbon atoms. They may be described as alkali metal carboxylates of saturated or unsaturated hydrocarbons having about 8 to about 24 carbon atoms.

Fatty acid soaps are made from fatty acids that may be different fatty acids, typically fatty acids containing fatty acid moieties with chain lengths of from $C_8$ to $C_{24}$. Subject to defined requirements of having at least certain amount of $C_{10}$, of maintaining defined ratio of oleate to $C_{10}$, of minimizing unsaturated $C_{18}$ other than oleate, and of maintaining defined molar ratio of C10 soap and unsaturated fatty acid soap, the fatty acid blend may contain relatively pure amounts of one or more fatty acids. Suitable fatty acids include, but are not limited to, butyric, caproic, caprylic, capric, lauric, myristic, myristelaidic, pentadenanoic, palmitic, palmitoleic, margaric, heptadecenoic, stearic, oleic, linoleic, linolenic, arachidic, gadoleic, behenic and lignoceric acids and their isomers. In some preferred forms, the fatty acid blend has low levels of fatty acid with saturated fatty acid moiety chain length of 14 carbon atoms (myristic acid).

Typically, the chain length of fatty acid soaps varies depending on starting fat or oil feedstock (for purposes of this specification, "oil" and "fat" are used interchangeably, except where context demands otherwise). Longer chain fatty acid soaps (e.g., $C_{16}$ palmitic or $C_{18}$ stearic) are typically obtained from tallow and palm oils, and shorter chain soaps (e.g., $C_{12}$ lauric) may typically be obtained from, for example, coconut oil or palm kernel oil. The fatty acid soaps produced may also be saturated or unsaturated (e.g., oleic acid) subject, as noted, to requirements of the invention.

Typically, longer molecular weight fatty acid soaps (e.g., $C_{14}$ to $C_{22}$ soaps), especially longer, saturated soaps are insoluble and do not generate good foam volumes, despite the fact that they can help making the foam generated by other soluble soaps creamier and more stable. Conversely shorter molecular weight soaps (e.g., $C_8$ to $C_{12}$) and unsaturated soaps (e.g., from oleic acid) lather quickly. However, the longer chain soaps (typically saturated, although they may also contain some level of unsaturated such as oleic) are desirable in that they maintain structure and do not dissolve as readily. Unsaturated soaps (e.g., oleic) are soluble and lather quickly, like short-chained soaps, but form a denser, creamier foam, like the longer chained soaps.

Soap stock does not typically have levels of $C_{10}$ fatty acid materials at levels at 7% and higher, especially 8% and higher (e.g., palm kernel oils (PKO), coconut oils). These $C_{10}$ soap levels below 7% by wt. are below preferred levels of bars of the invention. Bars with, for example, 76% total fatty matter, max out at 4% $C_{10}$ fatty acid soap. In common commercial bars which are 70/30 mix of PKO/coconut oils, this level is maybe 1.7%. Moreover, levels of $C_{18}$ soap are typically about 30%, far higher than the level of $C_{10}$ soap. Absent knowledge of the advantage of high $C_{10}$, low $C_{18}$ soap (e.g., low ratio of unsaturated $C_{18}$ to $C_{10}$), there is no reason to make such bars. The advantage of doing so to achieve fast acting antibacterial effect with room temperature conditions and, as far as applicants are aware, this advantage is unrecognized in the art. As such, there is no reason to select or design such stock.

It should be noted that, typically, longer molecular weight saturated fatty acid soaps (e.g., $C_{14}$ to $C_{22}$ soaps are insoluble and do not generate good foam volumes, despite the fact that they can help making the foam generated by other soluble soaps creamier and more stable.

Organic and Inorganic Adjuvant Materials

The total level of the adjuvant materials used in the bar composition should be in an amount not higher than 50%, preferably 1 to 50%, more preferably 1 to 45%, furthermore preferably 3 to 45% by wt. of the soap bar composition.

Suitable starchy materials which may be used include natural starch (from corn, wheat, rice, potato, tapioca and the like), pre-gelatinized starch, various physically and chemically modified starch and mixtures thereof. By the term natural starch is meant starch which has not been subjected to chemical or physical modification—also known as raw or native starch.

A preferred starch is natural or native starch from maize (corn), cassava, wheat, potato, rice and other natural sources of it. Raw starch with different ratio of amylose and amylopectin: e.g. maize (25% amylose); waxy maize (0%); high amylose maize (70%); potato (23%); rice (16%); sago (27%); cassava (18%); wheat (30%) and others. The raw starch can be used directly or modified during the process of making the bar composition such that the starch becomes gelatinized, either partially or fully gelatinized.

Another suitable starch is pre-gelatinized which is starch that has been gelatinized before it is added as an ingredient in the present bar compositions. Various forms are available that will gel at different temperatures, e.g., cold water dispersible starch. One suitable commercial pre-gelatinized starch is supplied by National Starch Co. (Brazil) under the trade name FARMAL® CS 3400 but other commercially available materials having similar characteristics are suitable.

Polyol

Another organic adjuvant could be a polyol or mixture of polyols. Polyol is a term used herein to designate a compound having multiple hydroxyl groups (at least two, preferably at least three) which is highly water soluble, preferably freely soluble, in water.

Many types of polyols are available including: relatively low molecular weight short chain polyhydroxy compounds such as glycerol and propylene glycol; sugars such as sorbitol, manitol, sucrose and glucose; modified carbohydrates such as hydrolyzed starch, dextrin and maltodextrin, and polymeric synthetic polyols such as polyalkylene glycols, for example polyoxyethylene glycol (PEG) and polyoxypropylene glycol (PPG).

Especially preferred polyols are glycerol, sorbitol and their mixtures.

The level of polyol can be important in forming a thermoplastic mass whose material properties are suitable for both high speed manufacture (300-400 bars per minute) and for use as a personal washing bar. For example, when the polyol level is too low, the mass may not be sufficiently plastic at the extrusion temperature (e.g., 40° C. to 45° C.) and the bars tend to exhibit higher mushing and rates of wear. Conversely, when the polyol level is too high, the mass may become too soft to be formed into bars by high speed at normal process temperature.

In a preferred embodiment, the bars of the invention comprise 0 to 35%, preferably 0.5 to 15% by wt. polyol. Preferred polyols, as noted, include glycerol, sorbitol and mixtures thereof.

The adjuvant system may optionally include insoluble particles comprising one or a combination of materials. By insoluble particles is meant materials that are present in solid particulate form and suitable for personal washing. Preferably, there are mineral (e.g., inorganic) or organic particles.

The insoluble particles should not be perceived as scratchy or granular and thus should have a particle size less than 300 microns, more preferably less than 100 microns and most preferably less than 50 microns.

Preferred inorganic particulate material includes talc and calcium carbonate. Talc is a magnesium silicate mineral material, with a sheet silicate structure and a composition of $Mg_3Si_4(OH)_{22}$ and may be available in the hydrated form. It has a plate-like morphology, and is essentially oleophilic/hydrophobic, i.e., it is wetted by oil rather than water.

Calcium carbonate or chalk exists in three crystal forms: calcite, aragonite and vaterite. The natural morphology of calcite is rhombohedral or cuboidal, acicular or dendritic for aragonite and spheroidal for vaterite.

Commercially, calcium carbonate or chalk known as precipitated calcium carbonate is produced by a carbonation method in which carbon dioxide gas is bubbled through an aqueous suspension of calcium hydroxide. In this process, the crystal type of calcium carbonate is calcite or a mixture of calcite and aragonite.

Examples of other optional insoluble inorganic particulate materials include alumino silicates, aluminates, silicates, phosphates, insoluble sulfates, borates and clays (e.g., kaolin, china clay) and their combinations.

Organic particulate materials include insoluble polysaccharides such as highly crosslinked or insolubilized starch (e.g., by reaction with a hydrophobe such as octyl succinate) and cellulose; synthetic polymers such as various polymer lattices and suspension polymers; insoluble soaps and mixtures thereof.

Bar compositions preferably comprise 0.1 to 25% by wt. of bar composition, preferably 5 to 15% by wt. of these mineral or organic particles.

Water

Bars of the invention comprise 5 to 30% by wt., preferably 13 to 28% by wt. water.

Optional Ingredients

Synthetic surfactants: The bar compositions can optionally include non-soap synthetic type surfactants (detergents)—so called syndets. Syndets can include anionic surfactants, nonionic surfactants, amphoteric or zwitterionic surfactants and cationic surfactants.

The level of synthetic surfactant present in the bar is generally less than 25%, preferably less than 15%, preferably up to 10%, and most preferably from 0 to 7% based on the total weight of the bar composition.

The anionic surfactant may be, for example, an aliphatic sulfonate, such as a primary alkane (e.g., $C_8$-$C_{22}$) sulfonate, primary alkane (e.g., $C_8$-$C_{22}$) disulfonate, $C_8$-$C_{22}$ alkene sulfonate, $C_8$-$C_{22}$ hydroxyalkane sulfonate or alkyl glyceryl ether sulfonate (AGS); or an aromatic sulfonate such as alkyl benzene sulfonate. Alpha olefin sulfonates are another suitable anionic surfactant.

The anionic may also be an alkyl sulfate (e.g., $C_{12}$-$C_{18}$ alkyl sulfate), especially a primary alcohol sulfate or an alkyl ether sulfate (including alkyl glyceryl ether sulfates).

The anionic surfactant can also be a sulfonated fatty acid such as alpha sulfonated tallow fatty acid, a sulfonated fatty acid ester such as alpha sulfonated methyl tallowate or mixtures thereof.

The anionic surfactant may also be alkyl sulfosuccinates (including mono- and dialkyl, e.g., $C_6$-$C_{22}$ sulfosuccinates); alkyl and acyl taurates, alkyl and acyl sarcosinates, sulfoacetates, $C_8$-$C_{22}$ alkyl phosphates and phosphates, alkyl phosphate esters and alkoxyl alkyl phosphate esters, acyl lactates or lactylates, $C_8$-$C_{22}$ monoalkyl succinates and maleates, sulphoacetates, and acyl isethionates.

Another class of anionics is $C_8$ to $C_{20}$ alkyl ethoxy (1-20 EO) carboxylates.

Another suitable anionic surfactant is $C_8$-$C_{18}$ acyl isethionates. These esters are prepared by reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms. The acyl isethionate may also be alkoxylated isethionates Acyl isethionates, when present, will generally range from about 0.5% to about 25% by weight of the total composition.

In general, the anionic component will comprise the majority of the synthetic surfactants used in the bar composition.

Amphoteric detergents which may be used in this invention include at least one acid group. This may be a carboxylic or a sulphonic acid group. They include quaternary nitrogen and therefore are quaternary amido acids. They should generally include an alkyl or alkenyl group of 7 to 18 carbon atoms. Suitable amphoteric surfactants include amphoacetates, alkyl and alkyl amido betaines, and alkyl and alkyl amido sulphobetaines.

Amphoacetates and diamphoacetates are also intended to be covered in possible zwitterionic and/or amphoteric compounds which may be used.

Suitable nonionic surfactants include the reaction products of compounds having a hydrophobic group and a reactive hydrogen atom, for example aliphatic alcohols or fatty acids, with alkylene oxides, especially ethylene oxide either alone or with propylene oxide. Examples include the condensation products of aliphatic ($C_8$-$C_{18}$) primary or secondary linear or branched alcohols with ethylene oxide, and products made by condensation of ethylene oxide with the reaction products of propylene oxide and ethylenediamine. Other so-called nonionic detergent compounds include long chain tertiary amine oxides, long chain tertiary phosphine oxides and dialkyl sulphoxides.

The nonionic may also be a sugar amide, such as alkyl polysaccharides and alkyl polysaccharide amides.

Examples of cationic detergents are the quaternary ammonium compounds such as alkyldimethylammonium halides.

Other surfactants which may be used are described in U.S. Pat. No. 3,723,325 to Parran Jr. and "Surface Active Agents and Detergents" (Vol. I & II) by Schwartz, Perry & Berch, both of which is also incorporated into the subject application by reference.

Finishing Adjuvant Materials

These are ingredients that improve the aesthetic qualities of the bar especially the visual, tactile and olefactory properties either directly (perfume) or indirectly (preservatives). A wide variety of optional ingredients can be incorporated in the bar composition of the invention. Examples of adjuvants include but are not limited to: perfumes; opacifying agents such as fatty alcohols, ethoxylated fatty acids, solid esters, and $TiO_2$; dyes and pigments; pearlizing agent such as $TiO_2$ coated micas and other interference pigments; plate like mirror particles such as organic glitters; sensates such as menthol and ginger; preservatives such as dimethyloldimethylhydantoin (Glydant XL1000), parabens, sorbic acid and the like; anti-oxidants such as, for example, butylated hydroxytoluene (BHT); chelating agents such as salts of ethylene diamine tetra acetic acid (EDTA) and trisodium etridronate; emulsion stabilizers; auxiliary thickeners; buffering agents; and mixtures thereof.

The level of pearlizing agent should be between about 0.1% to about 3%, preferably between 0.1% and 0.5% and most preferably between about 0.2 to about 0.4% based on the total weight of the bar composition.

Skin Benefit Agents

A particular class of optional ingredients highlighted here is skin benefit agents included to promote skin and hair health and condition. Potential benefit agents include but are not limited to: lipids such as cholesterol, ceramides, and pseudoceramides; antimicrobial agents such as TRICLOSAN; sunscreens such as cinnamates; other types of exfoliant particles such as polyethylene beads, walnut shells, apricot seeds, flower petals and seeds, and inorganics such as silica, and pumice; additional emollients (skin softening agents) such as long chain alcohols and waxes like lanolin; additional moisturizers; skin-toning agents; skin nutrients such as vitamins like Vitamin C, D and E and essential oils like bergamot, citrus unshiu, calamus, and the like; water soluble or insoluble extracts of avocado, grape, grape seed, myrrh, cucumber, watercress, calendula, elder flower, geranium, linden blossom, amaranth, seaweed, gingko, ginseng, carrot; impatiens balsamina, camu camu, alpina leaf and other plant extracts such as witch-hazel, and mixtures thereof.

The composition can also include a variety of other active ingredients that provide additional skin (including scalp) benefits. Examples include anti-acne agents such as salicylic and resorcinol; sulfur-containing D and L amino acids and their derivatives and salts, particularly their N-acetyl derivatives; anti-wrinkle, anti-skin atrophy and skin-repair actives such as vitamins (e.g., A, E and K), vitamin alkyl esters, minerals, magnesium, calcium, copper, zinc and other metallic components; retinoic acid and esters and derivatives such as retinal and retinol, vitamin B3 compounds, alpha hydroxy acids, beta hydroxy acids, e.g. salicylic acid and derivatives thereof; skin soothing agents such as aloe vera, jojoba oil, propionic and acetic acid derivatives, fenamic acid derivatives; artificial tanning agents such as dihydroxyacetone; tyrosine; tyrosine esters such as ethyl tyrosinate and glucose tyrosinate; skin lightening agents such as aloe extract and niacinamide, alpha-glyceryl-L-ascorbic acid, aminotyroxine, ammonium lactate, glycolic acid, hydroquinone, 4 hydroxyanisole, sebum stimulation agents such as bryonolic acid, dehydroepiandrosterone (DHEA) and orizano; sebum inhibitors such as aluminum hydroxy chloride, corticosteroids, dehydroacetic acid and its salts, dichlorophenyl imidazoldioxolan (available from Elubiol); anti-oxidant effects, protease inhibition; skin tightening agents such as terpolymers of vinylpyrrolidone, (meth)acrylic acid and a hydrophobic monomer comprised of long chain alkyl (meth) acrylates; anti-itch agents such as hydrocortisone, methdilizine and trimeprazine hair growth inhibition; 5-alpha reductase inhibitors; agents that enhance desquamation; anti-glycation agents; anti-dandruf agents such as zinc pyridinethione; hair growth promoters such as finasteride, minoxidil, vitamin D analogues and retinoic acid and mixtures thereof.

Electrolyte

The soap bars include 0.5 wt. % to 5 wt. % electrolyte. Preferred electrolytes include chlorides, sulphates and phosphates of alkali metals or alkaline earth metals. Without wishing to be bound by theory it is believed that electrolytes help to structure the solidified soap mass and also increase the viscosity of the molten mass by common ion effect. Comparative soap bars without any electrolyte were found to be softer. Sodium chloride and sodium sulphate are the most preferred electrolyte, more preferably at 0.6 to 3.6 wt. %, and most preferably at 1.0 to 3.6 wt. %.

Polymers

The soap bars may include 0.1 to 5 wt. % of a polymer selected from acrylates or cellulose ethers. Preferred acrylates include cross-linked acrylates, polyacrylic acids or sodium polyacrylates. Preferred cellulose ethers include carboxymethyl celluloses or hydroxyalkyl celluloses. A combination of these polymers may also be used, provided the total amount of polymers does not exceed 5 wt. %.

Acrylates

Preferred bars include 0.1 to 5% acrylates. More preferred bars include 0.15 to 3% acrylates. Examples of acrylate polymers include polymers and copolymers of acrylic acid crosslinked with polyallylsucrose as described in U.S. Pat. No. 2,798,053 which is herein incorporated by reference. Other examples include polyacrylates, acrylate copolymers or alkali swellable emulsion acrylate copolymers (e.g., ACULYN® 33 Ex. Rohm and Haas; CARBOPOL® Aqua SF-1 Ex. Lubrizol Inc.), hydrophobically modified alkali swellable copolymers (e.g., ACULYN® 22, ACULYN® 28 and ACULYN® 38 ex. Rohm and Haas). Commercially available crosslinked homopolymers of acrylic acid include CARBOPOL® 934, 940, 941, 956, 980 and 996 carbomers available from Lubrizol Inc. Other commercially available crosslinked acrylic acid copolymers include the CARBOPOL® Ultrez grade series (Ultrez® 10, 20 and 21) and the ETD series (ETD 2020 and 2050) available from Lubrizol Inc.

CARBOPOL® Aqua SF-1 is a particularly preferred acrylate. This compound is a slightly cross-linked, alkali-swellable acrylate copolymer which has three structural units; one or more carboxylic acid monomers having 3 to 10 carbon atoms, one or more vinyl monomers and, one or more mono- or polyunsaturated monomers.

Cellulose Ethers

Preferred bars include 0.1 to 5% cellulose ethers. More preferred bars include 0.1 to 3% cellulose ethers. Preferred cellulose ethers are selected from alkyl celluloses, hydroxyalkyl celluloses and carboxyalkyl celluloses. More preferred bars include hydroxyalkyl celluloses or carboxyalkyl celluloses and particularly preferred bars include carboxyalkyl cellulose.

Preferred hydroxyalkyl cellulose includes hydroxymethyl cellulose, hydroxyethyl cellulose, hydroxypropyl cellulose and ethyl hydroxyethyl cellulose.

Preferred carboxyalkyl cellulose includes carboxymethyl cellulose. It is particularly preferred that the carboxymethyl cellulose is in form of sodium salt of carboxymethyl cellulose.

Wax and Polyalkyleneglycols

Preferred wax includes paraffin wax and microcrystalline wax. When polyalkyleneglycols are used, preferred bars may include 0.01 to 5 wt. % Polyalkyleneglycols, more preferably 0.03 to 3 wt. % and most preferably 0.5 to 1 wt. %. Suitable examples include polyethyleneglycol and polypropyleneglycol. A preferred commercial product is POLYOX® sold by The Dow Chemical Company.

A preferred composition of the invention comprises (by wt.):

1) 25 to 85% soap, preferably sodium soap;
2) 0 to 35% polyol, preferably glycerine, sorbitol or mixture;
3) 0 to 25% particles; and
4) 10 to 30% water.

Protocols

In-Vitro Antimicrobial Protocol

Soap Slurry Preparation

The solid soap bar being evaluated is grated into small chips through a fine cheese grater. Soap bar chips were mixed with water at 10 wt. % and stirred on a magnetic stir plate overnight at 25° C. It is important to choose the dimensions of stir bar to maintain a vortex throughout the mixing. A uniform gel-like soap slurry was prepared and used freshly for in-vitro time-kill assay.

Bacteria

*Escherichia coli* ATCC 10536 was obtained as a lyophilized culture from American Type Culture Collection. Fresh test cultures were grown twice for 24 h on Tryptic Soy Agar (TSA) streak plate at 37.0° C. before each experiment. Then e. *Coli* suspension was prepared with Tryptone Sodium Chloride right before the efficacy tests.

In-Vitro Time-Kill Assay

Time-kill assays were performed at 25° C. according to the European Standard, EN 1040:2005 entitled "Chemical Disinfectants and Antiseptics—Quantitative Suspension Test for the Evaluation of Basic Bactericidal Activity of Chemical Disinfectants and Antiseptics—Test Method and Requirements (Phase 1)" incorporated herein by reference. Following this procedure, growth-phase bacterial cultures at $1.5\times10^8$ to $5\times10^8$ colony forming units per ml (cfu/ml) were treated with the soap solutions (prepared as described above) at 25° C. In forming the test sample 8 parts by weight of the soap solution, prepared as described above, were combined with 1 part by weight of culture and 1 part by weight of water. After 10, 20, and 30 seconds of exposure, samples were neutralized to arrest the antibacterial activity of the soap solutions. Then test solutions were serially diluted, plated on solid medium, incubated for 24 hours and surviving cells were enumerated. Bactericidal activity is defined as the log reduction in cfu/ml relative to the bacterial concentration at 0 seconds. Cultures not exposed to any soap solutions serve as no-treatment controls.

The $\log_{10}$ reduction was calculated using the formula:

$$\text{Log}_{10}\text{ Reduction}=\log_{10}\text{ (numbers control)}-\log_{10}\text{ (test sample survivors)}$$

Substrate Wash Assay

To determine the efficacy of a bar formulation to remove bacteria from substrates, in-vitro performance tests are performed on artificial skin samples (VITRO-SKIN™, IMS Corp., a synthetic substrate designed to mimic the surface chemistry of human skin). To prepare the substrate, pieces of VITRO-SKIN were hydrated overnight in a hydration chamber with a reservoir of 85% water, 15% glycerin. After approximately 24 hours, the VITRO-SKIN pieces were taken out of the chamber and allowed to rest at ambient temperature and humidity for approximately one hour, and then 5 cm Diameter circular sections were mounted between the opposing pieces of an XRF cup. Each VITRO-SKIN used was inoculated evenly with $1.5\times10^8$-$5\times10^8$ CFUs *e. Coli* by using 100 ul of culture obtained from an overnight growth as described above. The bacteria was allowed to dry on the VITRO-SKIN for 30 minutes.

To mimic washing the skin, bar soap composition were cut into a 1 cm diameter cylinder and bar was wetted in DI Water. After wetting VITRO-SKIN with 0.7 ml water, the bar soap composition was rubbed gently across the entire VITRO-SKIN surface inside XRF cup for 15 seconds. Then, lather was generated by continuously rubbing the VITRO-SKIN with a Teflon rod for 45 seconds (e.g. absent the bar soap composition). The wash liquor was removed and the VITRO-SKIN was rinsed by adding 10 ml of deionized water to the XRF cup, and rubbing the substrate with a clean Teflon rod for 30 seconds. The rinse step was repeated one more time.

After removing rinse liquor, 10 ml ice cold D/E broth was immediately added into each XRF cup. Cups were tightly covered with Teflon and were vigorously shaken for 1 min to dislodge bacteria. Serial dilutions of the fluids were made and plated for colony counting on Tryptic Soy Agar for 24 hours at 37° C. Then, the CFU/ml was counted and calculated, and results were reported as $\log_{10}$ CFU. The smaller $\log_{10}$ (CFU/ml) value corresponds to a better efficiency of bar to remove bacteria from substrate.

EXAMPLES

The following examples further describe and demonstrate embodiments within scope of the invention. The examples are given solely for purposes of illustration and are not to be construed as limitations, as many variations thereof are possible without departing from the spirit and scope of the invention.

Table 1:

Time-Kill Efficacy as A Function of Unsaturated $C_{18}$ Soap (e.g., oleate)/Na Caprate Ratio.

In the mixture Na Caprate is maintained at a fixed level simulating a soap bar containing 16 wt. % Na Caprate, as well as Na $C_{18}$ soap varying in the range of 0 to 22 wt. %.

TABLE 1

| | Na salt of unsaturated $C_{18}$/ Na Caprate Weight Ratio | Nominal Na Caprate wt. % in simulated bar | Nominal Na $C_{18}$ wt. % in simulated bar | $Log_{10}$ Reduction against *E.coli* ATCC 10536 at contact time of 30 seconds |
|---|---|---|---|---|
| Example 1 | 0.00 | 16.4 | 0 | 3.3 ± 0.2 |
| Example 2 | 0.26 | 16.4 | 4.3 | 3.4 ± 0.2 |
| Example 3 | 0.52 | 16.4 | 8.6 | 2.6 ± 0.1 |
| Example 4 | 0.79 | 16.4 | 12.9 | 1.4 ± 0.1 |
| Example 5 | 1.05 | 16.4 | 17.2 | 1.2 ± 0.1 |
| Comparative A | 1.31 | 16.4 | 21.5 | 0.9 ± 0.1 |
| Comparative B | To infinity | 0 | 16.5 | 0.1 ± 0.1 |

As demonstrated by the Table 1 data, Na soap of unsaturated $C_{18}$ fatty acid begins to suppress the biocidal efficacy of Na Caprate (we have defined as $\log_{10}$ reduction against *E. coli* ATCC 10536 of at least 1.0, preferably at least 1.2, more preferably at least 1.4) when ratio of unsaturated $C_{18}$ soap to caprate is below 1.2. When Na soap of unsaturated $C_{18}$/Na Caprate ratio increases above 1.3, Na Caprate almost completely lost its biocidal efficacy. The testing solution contains Na Caprate at a fixed concentration of 1.64 wt. % simulating a bar content of 16.4 wt. %, as well as Na soap of unsaturated $C_{18}$ at the concentration range of 0 to 2.15 wt. % simulating bar content range between 0 and 17.2 wt. %. As noted, $C_{10}$ soap can be as low as 7% by wt. so long as ratio of $C_{18}$ unsaturated to $C_{10}$ is 1.2 and below.

TABLE 2

| Ingredients (wt. %) | Comparative C | Example 6 | Comparative D | Comparative E |
|---|---|---|---|---|
| Sodium Caprylate | 25.64 | / | / | / |
| Sodium Caprate | / | 25.64 | / | / |
| Sodium Laurate | / | / | 25.64 | / |
| Sodium Myristate | / | / | / | 25.64 |
| Sodium Palmitate | 10.52 | 10.52 | 10.52 | 10.52 |
| Sodium Stearate | 13.76 | 13.76 | 13.76 | 13.76 |
| Sodium Oleate | 26.63 | 26.63 | 26.63 | 26.63 |
| Sodium Linoleate | 3.97 | 3.97 | 3.97 | 3.97 |
| Sodium Linolenate | 0.28 | 0.28 | 0.28 | 0.28 |
| Sodium Chloride | 0.72 | 0.72 | 0.72 | 0.72 |
| EDTA | 0.04 | 0.04 | 0.04 | 0.04 |
| EHDP | 0.02 | 0.02 | 0.02 | 0.02 |
| Tinopal CBS-X | 0.024 | 0.024 | 0.024 | 0.024 |

TABLE 2-continued

| Ingredients (wt. %) | Comparative C | Example 6 | Comparative D | Comparative E |
|---|---|---|---|---|
| Palm Kernel Oil fatty acid | 0.50 | 0.50 | 0.50 | 0.50 |
| Fragrance | 1.25 | 1.25 | 1.25 | 1.25 |
| Water | 16.63 | 16.63 | 16.63 | 16.63 |

Comparing effect of short chain soaps between C10 and C14 on antimicrobial efficacy (while keeping long saturated soaps and unsaturated soaps constant).

TABLE 3

| Reference | Details | $Log_{10}$ Reduction against *E.coli* ATCC 10536 at contact time of 20 seconds |
|---|---|---|
| Comparative C | Soap bar enriched with Na Caprylate | 0.1 ± 0.0 |
| Example 6 | Soap bar enriched with Na Caprate | >3.3 |
| Comparative D | Soap bar enriched with Na Laurate | 0.4 ± 0.2 |
| Comparative E | Soap bar enriched with Na Myristate | 0.0 ± 0.0 |

Time-Kill Efficacy as A Function of short chain soaps between C10 and C14.

As demonstrated by the data in Tables 2 and 3, among soap bars enriched with different short-chain soaps, the one with Na Caprate has the best antimicrobial time-kill efficacy. In other words, it is use of minimum levels of $C_{10}$ soap which has surprising activity. It is $C_{10}$ levels of 25.64 (where ratio of specifically unsaturated $C_{18}$ to $C_{10}$ is 1.20) providing the kill. $C_8$, $C_{12}$ and $C_{14}$ provide far smaller activity.

TABLE 4

| | Comp. F | Example 7 | Example 8 | Example 9 |
|---|---|---|---|---|
| Sodium Caprate | 6.00 | 8.00 | 10.00 | 16.00 |
| Sodium Laurate | 2.00 | 2.00 | 2.00 | 2.00 |
| Sodium Myristate | 1.71 | 1.65 | 1.59 | 1.42 |
| Sodium Palmitate | 23.71 | 22.91 | 22.11 | 19.70 |
| Sodium Stearate | 26.48 | 25.58 | 24.69 | 22.00 |
| Sodium Oleate | 0.31 | 0.30 | 0.29 | 0.26 |
| Sodium Linoleate | 0.36 | 0.35 | 0.34 | 0.30 |
| Sodium Linoleneate | 0.04 | 0.04 | 0.04 | 0.03 |
| Sodium Ricinoleate | 6.44 | 6.22 | 6.01 | 5.35 |
| Glycerin | 4.50 | 4.50 | 4.50 | 4.50 |
| Trisodium Citrate Dihydrate | 3.00 | 3.00 | 3.00 | 3.00 |
| Talc | 6.00 | 6.00 | 6.00 | 6.00 |
| Sodium Chloride | 0.70 | 0.70 | 0.70 | 0.70 |
| Na4Etidronate | 0.04 | 0.04 | 0.04 | 0.04 |
| Na4EDTA | 0.17 | 0.17 | 0.17 | 0.17 |
| Perfume | 1.185 | 1.185 | 1.185 | 1.185 |
| Cl 11980 | 0.06 | 0.06 | 0.06 | 0.06 |
| Cl 12490 | 0.06 | 0.06 | 0.06 | 0.06 |
| Water | 17.24 | 17.24 | 17.24 | 17.24 |

Soap bar formulations with increasing sodium caprate.

TABLE 5

| Reference | Details | Time-kill Efficacy ($Log_{10}$ Reduction against *E.coli* ATCC 10536 at contact time of 30 seconds) |
|---|---|---|
| Comp. F | Marketed bar (Lifebuoy bar data) | 0.1 ± 0.1 |

TABLE 5-continued

| Reference | Details | Time-kill Efficacy ($Log_{10}$ Reduction against *E.coli* ATCC 10536 at contact time of 30 seconds) |
|---|---|---|
| Example 7 | Soap bar with 8% Na Caprate | 0.4 ± 0.1 |
| Example 8 | Soap bar with 10% Na Caprate | 1.2 ± 0.4 |
| Example 9 | Soap bar with 16% Na Caprate | >3.1 |

Antimicrobial Efficacy as a function of sodium caprate content in soap bar.

As demonstrated by the data in Tables 4 and 5, antimicrobial time-kill efficacy increases with sodium caprate content in soap bar formulations. The Examples show $C_{10}$ levels as low as 8%, work. The key is to maintain levels of oleate low relative to $C_{10}$.

TABLE 6

| Reference | Na Oleate wt. % in model bar | Na Oleate to Na Caprate weight ratio | $Log_{10}$ Reduction against *E.coli* ATCC 10536 at contact time of 30 seconds |
|---|---|---|---|
| Example 10 | 0.0 | — | 3.7 |
| Example 11 | 6.1 | 0.40 | 2.2 |
| Comp. G | 25.0 | 1.64 | 0.28 |

Time kill efficacy for model bars with 15.2 wt. % Na Caprate buffered with 0.4 wt. % carbonate, including variable levels of Na oleate Table 6 models compositions with 15.2% and varying amounts of oleate. When no unsaturated $C_{18}$ (e.g., oleate) is present ($C_{10}$ activity unimpeded), Example 10 shows good antimicrobial activity ($log_{10}$ reduction of 3.7). Activity is still good with presence of oleate at 6.1% as long as ratio of $C_{10}$ to oleate is low (Example 11). When ratio is too high (Comparative G), effect is very low.

TABLE 7

| | Comparative H | Comparative I | Comparative J |
|---|---|---|---|
| Sodium Caprate | 8.0 | 12.00 | 16.00 |
| Sodium Laurate | 0.00 | 0.00 | 0.00 |
| Sodium Myristate | 0.00 | 0.00 | 0.00 |
| Sodium Palmitate | 35.22 | 35.22 | 35.22 |
| Sodium Stearate | 2.76 | 2.76 | 2.76 |
| Sodium Oleate | 24.29 | 24.29 | 24.29 |
| Sodium Linoleate | 5.79 | 5.79 | 5.79 |
| Sodium Linolenate | 0.00 | 0.00 | 0.00 |
| Sodium Ricinoleate | 0.00 | 0.00 | 0.00 |
| Glycerin | 4.00 | 4.00 | 4.00 |
| Trisodium Citrate Dihydrate | 2.00 | 2.00 | 2.00 |
| Talc | 6.00 | 6.00 | 6.00 |
| Sodium Chloride | 0.70 | 0.70 | 0.70 |
| Na4Etidronate | 0.04 | 0.04 | 0.04 |
| Na4EDTA | 0.17 | 0.17 | 0.17 |
| Perfume | 1.185 | 1.185 | 1.185 |
| Cl 11980 | 0.06 | 0.06 | 0.06 |
| Cl 12490 | 0.06 | 0.06 | 0.06 |
| Water | 17.31 | 17.31 | 17.31 |

Compositions of formulated bars with Na Oleate/Na Caprate weight ratios between 1 and 3.

TABLE 8

| | Na Oleate/ Na Caprate Weight Ratio | Nominal Na Caprate wt. % in bar | Nominal Na Oleate wt. % in bar | Log 10 Reduction against *E.coli* ATCC 10536 at contact time of 30 seconds |
|---|---|---|---|---|
| Comparative H | 3.0 | 8.0 | 24.3 | 0.3 +/− 0.1 |
| Comparative I | 2.0 | 12.0 | 24.3 | 0.0 +/− 0.1 |
| Comparative J | 1.5 | 16.0 | 24.3 | 0.3 +/− 0.2 |

Time kill efficacy for formulated bars with Na Oleate/Na Caprate weight ratios between 1.5 and 3.

As demonstrated in table 7 and 8, ratios of Na Oleate/Na Caprate from 1.5 to 3 completely suppress antimicrobial activity.

TABLE 9

| Formulation Ref. 10/Ingredients | Wt % |
|---|---|
| C10 soap:Oleate soap ratio | 0.76 |
| Sodium Caprate | 8.5 |
| Sodium Laurate | 8.5 |
| Sodium Ricinoleate | 6.528 |
| Sodium Palmitate/Stearate (55:45) | 45.68 |
| Glycerine | 4 |
| Talc | 6 |
| Tetrasodium EDTA | 0.04 |
| Tetrasodium Etidronate | 0.166 |
| Sodium Chloride | 0.7 |
| Sodium Citrate Dihydrate | 2 |
| Cl 12490 | 0.055 |
| Cl 11680 | 0.06 |
| Perfume | 1.185 |
| water | Up to 100 |
| Log Kill 30 sec | 2.2 |

The data shows that the composition exhibits a 2.2 log kill at 30 seconds at about 8% Sodium caprate level. The ratio of oleate to caprate is 0.76. This formulation is outside the invention.

TABLE 10

| Formulation ref. 11/Ingredients | Wt % |
|---|---|
| Capric acid (C10 acid) soap | 7.00 |
| Lauric acid soap | 7.50 |
| Potassium Hydroxide | 0.00 |
| Butylated Hydroxy Toluene | 0.01 |
| Glycerin | 20.00 |
| Sodium Citrate Dihydrate | 6.00 |
| Potassium Chloride | 1.50 |
| Hysteric Acid (C16:C18 acid 55:45) | 9.9 |
| Sodium Ricinolate | 1.85 |
| Sodium Hydroxide | 10.35 |
| Etidronic acid | 0.20 |
| EDTA Tetra Sodium salt | 0.10 |
| Sorbitol | 12.6 |
| Sodium chloride | 0.70 |
| Isopropyl Alcohol | 2.50 |
| Water | Up to 100 |
| Log Kill (30 seconds) | 3.5 |
| Oleate soap: C10 soap | 0.26 |

The data shows that the composition exhibits a 3.5 log kill at 30 seconds at about 7% Sodium caprate level. The ratio of oleate to caprate is 0.26.

The invention claimed is:

1. A soap bar composition comprising:

a) 25 to 85% by weight of $C_8$ to $C_{24}$ fatty acid soap comprising:
 (i) $C_{10}$ soap at 9% or greater by weight of total bar composition; and,
 (ii) unsaturated $C_{18}$ soap, wherein weight ratio of said unsaturated $C_{18}$ soap to $C_{10}$ (caprate) soap is 0.55 to 0.1;

b) 1 to 45% organic and inorganic adjuvant materials by weight of the composition; and, c) 5 to 30% water by weight of the composition, wherein excess of $C_{10}$ soap to unsaturated $C_{18}$ soap is at least 6%;

wherein, the unsaturated $C_{18}$ soap includes their hydroxy derivatives; and wherein the soap bar composition provides a $log_{10}$ reduction of *E. coli* ATCE 10536 at contact time of 30 seconds, of 2.6 or greater.

2. The soap bar composition according to claim 1, wherein unsaturated $C_{18}$ fatty acid soap is an unsaturated $C_{18}$ fatty acid soap with 1, 2, or 3 unsaturated groups; or a mixture thereof.

3. The soap bar composition according to claim 2, comprising $C_{10}$ soap at 16 to 32% by weight of total bar composition.

4. The soap bar composition according to claim 1, wherein said organic and inorganic adjuvant materials are selected from the group consisting of fillers, polyols, salts and mixtures thereof.

5. The soap bar composition according to claim 1, comprising 35 to 75% by weight of $C_8$ to $C_{24}$ fatty acid soap.

6. The soap bar composition according to claim 1, comprising 13 to 28% water by weight of the composition.

* * * * *